United States Patent Office 3,127,442
Patented Mar. 31, 1964

3,127,442
METHOD FOR PREPARING ALKALI SALTS OF
β-ALKYLVINYLSULFONATES
Leslie M. Schenck, Mountainside, and John H. Shown, Westfield, N.J., assignors to General Aniline & Film Corporation, New York, N.Y., a corporation of Delaware
No Drawing. Filed Oct. 12, 1960, Ser. No. 62,087
5 Claims. (Cl. 260—513)

The present invention relates to an improved method for the preparation of alkali metal salts of β-alkylvinyl sulfonates.

It is known that olefin sulfonates may be prepared by reacting an olefin halide and sodium sulfite according to the well-known Strecker reaction, or by oxidation of olefinic mercaptans. The usefulness of olefin sulfonates as their free acids or salts is disclosed in several patents. British Patent 568,725 teaches their usage as Nekal-type detergents. U.S.P. 2,500,449; 2,523,190 and 2,423,191 disclose the advantages of the olefin sulfonates as plating bath additives. U.S.P. 2,601,251 and 2,601,256 teach the usefulness of these compounds in copolymer fibers.

Lambert and Rose, J. Chemical Society, 1949, Part I, pp. 46–49, described two methods for the preparation of 2-propene-1-sodium sulfonate. (1) Treatment of either n- or iso-propylalcohol with 65% oleum followed by alkali, (2) conversion of 2-hydroxypropane-1-sulfonate to the corresponding 2-chloropropane-1-sulfonate with PCl₅, followed by alkaline hydrolysis. These two reactions may be represented in the following manner:

(1)

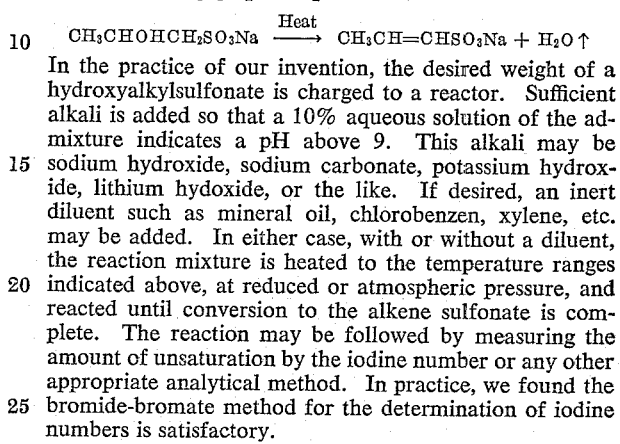

(2)

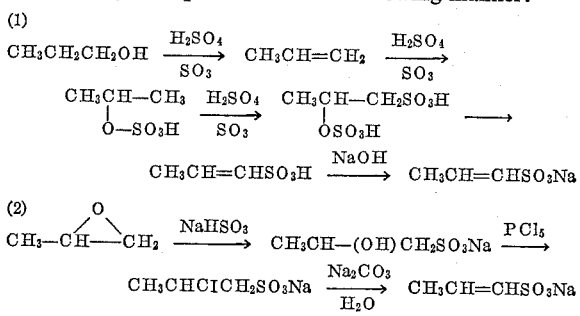

While the prior art provides several discrete approaches for the manufacture of alkene sulfonates, the intermediates and processing requirements for the several steps involved in these syntheses are for the most part cumbersome and uneconomical in practice. In each instance, the synthesis yields additional chemical by-products other than water. Besides the cost involved for the chemical elements in those unwanted by-products, additional processing costs are required to ilosate the olefin sulfonates from these contaminants.

It is the principal object of the present invention to provide a direct method of preparing β-alkylvinylsulfonates from hydroxyalkane sulfonates.

Other objects and advantages will become more clearly evident from the following description:

We have discovered that the indirect methods of the prior art are unnecessary in the preparation of olefin sulfonates from commercially available hydroxyalkanesulfonates. We further discovered that under proper conditions, hydroxyalkanesulfonates undergo a thermal decomposition with the elimination of one molecule of water to provide a substantially quantitative conversion (99%) of the hydroxyalkanesulfonate to the corresponding β-alkylvinylsulfonates, hereinafter referred to sometimes as alkenesulfonates. We found that this reaction is catalyzed by alkaline conditions at temperatures in excess of 100° C., and virtually non-existant when the reaction conditions are made acidic. For this dehydration to be most effective, the pH should be above 9.0, with our preferred range being between 9.7 and 11.7. The reaction temperature should be between 120°–210° C., the preferred temperature range being 130–150° C., if an inert solvent is employed, and 170–210° C. if no heat transfer medium is admixed with the dry powder. The simplicity of our invention contrasted with the prior art is exemplified in the following graphical presentation:

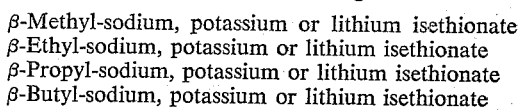

In the practice of our invention, the desired weight of a hydroxyalkylsulfonate is charged to a reactor. Sufficient alkali is added so that a 10% aqueous solution of the admixture indicates a pH above 9. This alkali may be sodium hydroxide, sodium carbonate, potassium hydroxide, lithium hydoxide, or the like. If desired, an inert diluent such as mineral oil, chlorobenzen, xylene, etc. may be added. In either case, with or without a diluent, the reaction mixture is heated to the temperature ranges indicated above, at reduced or atmospheric pressure, and reacted until conversion to the alkene sulfonate is complete. The reaction may be followed by measuring the amount of unsaturation by the iodine number or any other appropriate analytical method. In practice, we found the bromide-bromate method for the determination of iodine numbers is satisfactory.

As examples of hydroxy alkane sulfonates (β-alkyl-isethionates) in the form of the sodium, potassium or lithium salt, which are converted to alkene sulfonates (β-alkylvinylsulfonates), the following are illustrative:

β-Methyl-sodium, potassium or lithium isethionate
β-Ethyl-sodium, potassium or lithium isethionate
β-Propyl-sodium, potassium or lithium isethionate
β-Butyl-sodium, potassium or lithium isethionate The following examples will describe in more detail the process involved for preparing the β-alkylvinylsulfonates:

*Example I*

A total of 200 parts of sodium β-methyl isethionate were charged to a vacuum reaction vessel equipped with an agitator. Sufficient powdered sodium hydroxide was blended into the charge to produce a mixture which had a pH of 9.7 at 10% concentration in water. The vessel was evacuated to 2 mm. and the admixture was slowly heated to 190° C. with agitation. It was then heated to 210° over 40 minutes, cooled to room temperature and discharged. Assay of the reaction product showed an iodine number of 175 (theory 177) which represented a 99% conversion to sodium β-methylvinylsulfonate.

*Example II*

The same conditions were used as those in Example I with the exception that the pH was adjusted to 3.6 by the addition of sodium dihydrogen phosphate. The reaction mixture was found to have an iodine number of 0 which indicated no conversion to the desired sodium β-methyl-vinylsulfonate.

*Example III*

This example differed from Example II only in that the pH was adjusted to 7.7. The reaction product was found to have an iodine number of 1.26 which indicated a conversion of 0.78% to sodium β-methylvinylsulfonate.

*Example IV*

This example differs from Example I only in that it was conducted at atmospheric pressure and sufficient powdered potassium hydroxide was blended with sodium β-methyl isethionate to give a mixture which has a pH of 11.7 at a 10% concentration in water. The product had an iodine number of 96.4 which represents a 54% conversion to sodium-β-methylvinylsulfonate.

Example V

A total of 50 parts of sodium β-methyl isethionate which had been adjusted to a pH of 9.2 with powdered sodium hydroxide was charged to a reaction vessel containing 200 parts of chlorobenzene. The charge was heated for 6 hours at 130–135° C. and 100 parts of chlorobenzene removed by distillation. The resulting slurry was cooled to room temperature and the reaction product was removed by filtration. It was found to have an iodine number of 93.6 which represents a conversion of 53% to sodium-methylvinylsulfonate.

Example VI

Operating as in Example I, 200 parts of sodium β-ethyl isethionate were substituted for the 200 parts of sodium β-methyl isethionate. There was obtained 97% conversion to sodium β-ethylvinylsulfonate.

Example VII

Operating as in Example I, 200 parts of sodium β-propylisethionate were substituted for the 200 parts of sodium-β-methylisethionate. There was obtained a 91% conversion of the hydroxyalkanesulfate to the unsaturated sodium β-propylvinylsulfonate.

Example VIII

Example I was repeated with the exception that 200 parts of sodium-β-methylisethionate were replaced by 200 parts of sodium β-butylisethionate. There was obtained a 90% conversion to sodium β-butylvinylsulfonate.

The products prepared as above do not ordinarily lend themselves to further purification, and are usually used per se without stabilization or as intermediates for further synthesis. However, if some degree of stabilization is required, common types of antioxidants including sodium nitrite, hydroquinone and substituted phenols should prove effective. The amount of caustic soda required to establish our preferred pH condition is so slight it should be given no consideration as an impurity warranting removal.

The utility of the products resulting from the foregoing examples is precisely the same as that disclosed in the aforementioned prior art. In other words, to employ the products of each of the foregoing examples, all that is necessary is to briefly review the teachings of British Patent 568,725 and United States Patents 2,500,449; 2,523,190; 2,523,191; 2,601,251 and 2,601,256 which will show the effectiveness of the products in various commercial applications.

We claim:

1. The process of preparing alkali metal salts of β-alkylvinylsulfonates of the general formula:

$$R-CH=CHSO_3X$$

wherein R is an alkyl group of 1 to 4 carbon atoms and X is an alkali metal which comprises dehydrating by heating an alkali metal salt of a β-alkylisethionate in which the alkyl group contains from 1 to 4 carbon atoms in the presence of an alkaline material selected from the class consisting of alkali metal carbonates and hydroxides at a pH between 9.2 and 11.7 and a temperature between 120°–210° C., said pH being determined from a 10% aqueous solution of the admixture of said alkali metal salt and said alkaline material prior to dehydrating.

2. The process according to claim 1 wherein the β-alkylisethionate is β-methylisethionate.

3. The process according to claim 1 wherein the β-alkylisethionate is β-ethylisethionate.

4. The process according to claim 1 wherein the β-alkylisethionate is β-propylisethionate.

5. The process according to claim 1 wherein the β-alkylisethionate is β-butylisethionate.

References Cited in the file of this patent

UNITED STATES PATENTS 2,597,696     Anthes et al. _____ May 20, 1952

OTHER REFERENCES

Kohler: Am. J. Chem., vol. 20 (1898), page 683.
Degering et al.: An Outline of Organic Chemistry, 3rd ed., Barnes & Noble, Inc., New York, 1939, pp. 46, 49.